United States Patent [19]

Nijhawan et al.

[11] 4,435,197
[45] Mar. 6, 1984

[54] BAGHOUSE FILTER

[75] Inventors: Pramodh Nijhawan; William W. Avera, both of Winston-Salem, N.C.

[73] Assignee: The Bahnson Company, Winston-Salem, N.C.

[21] Appl. No.: 367,046

[22] Filed: Apr. 9, 1982

[51] Int. Cl.³ .............................................. B01D 46/02
[52] U.S. Cl. .................................... 55/341 R; 55/374; 55/379; 55/480; 55/481; 55/505
[58] Field of Search .................. 55/341 R, 374, 478, 55/480, 481, 378, 379, 502, 505, 506, 507

[56] References Cited

U.S. PATENT DOCUMENTS

| | | | |
|---|---|---|---|
| 1,489,831 | 4/1924 | Jordahl | 55/480 |
| 2,335,315 | 11/1943 | Seymour | 55/480 X |
| 3,023,447 | 3/1962 | Senne | 55/478 X |
| 3,680,285 | 8/1972 | Wellan et al. | 55/374 X |
| 3,729,903 | 5/1973 | Espeel et al. | 55/341 R X |
| 3,732,669 | 5/1973 | Chambers | 55/341 R X |
| 3,788,046 | 1/1974 | Kaeppler et al. | 55/341 R |
| 3,844,750 | 10/1974 | Ray . | |
| 3,849,092 | 11/1974 | Bakke et al. | 55/341 R X |
| 3,926,595 | 12/1975 | Bockman . | |
| 3,992,177 | 11/1976 | Welteroth . | |
| 4,141,704 | 2/1979 | Berglund . | |
| 4,194,894 | 3/1980 | Noland . | |
| 4,264,345 | 4/1981 | Miller | 55/341 R |
| 4,289,511 | 9/1981 | Johnson, Jr. | 55/341 R X |

FOREIGN PATENT DOCUMENTS

| | | | |
|---|---|---|---|
| 374883 | 5/1923 | Fed. Rep. of Germany | 55/481 |
| 2605521 | 8/1977 | Fed. Rep. of Germany | 55/341 R |
| 2479015 | 10/1981 | France | 55/374 |

Primary Examiner—Kathleen J. Prunner
Attorney, Agent, or Firm—Dann, Dorfman, Herrell and Skillman

[57] ABSTRACT

A baghouse filter having a filter chamber separated by a partition between the clean gas side and the dirty gas side. The partition has a plurality of apertures, in each of which is mounted a filter unit for removal and replacement. The housing has an access opening to permit access to the interior of the housing and the opening is sufficiently large to permit withdrawal of the partition from the housing through the opening so as to permit replacement of the filter units exteriorly of the housing. In the present instance, the partition of the housing is mounted on a door closing the access opening, so that the displacement of the access door from the housing automatically displaces the partition from the housing to permit removal and replacement of the filter units. The filter unit assemblies permit mounting of the filter units from the dirty gas side of the partition with suitable sealing to prevent unfiltered gaseous medium from bypassing of the filter units.

19 Claims, 12 Drawing Figures

BAGHOUSE FILTER

FIELD OF THE INVENTION

The present invention relates to apparatus for separating particulate matter from a flow of gaseous medium and has particular application to a baghouse in which the particulate matter is deposited on the outside of filter bags suspended in the baghouse.

BACKGROUND OF THE INVENTION

In baghouse filters of the stated type, the filter bags are suspended in a transverse partition within the filter housing and the gaseous medium is caused to flow through the housing in a direction such that the medium flows from the outside toward the inside of the filter bags and deposits the particulate matter on the exterior surface of the filter bags. Means is provided to periodically dislodge the particulate matter which has built up upon the exterior surfaces of the filter bags and the dislodged particulate matter is discharged from the bottom of the filter housing. A conventional apparatus for effecting such dislodgement is a bank of nozzles which are periodically activated to direct jets of air into the interiors of the filter bags. The filter bags may be cleaned sequentially or in unison by suitable programming of the activation of the jets. In order to prevent the bags from collapsing during the operation of the filter, cages or frames are inserted into the bags to maintain the bags open and prevent them from collapsing which would impede the flow of medium therethrough.

DESCRIPTION OF THE PRIOR ART

In a conventional pulse type baghouse, access to service the filter bags is from the top of the baghouse through removable panels or from a clean air chamber. In order to facilitate such access, the manifolds of cleaning jets are likewise mounted for displacement and when displaced, the individual filter bags are removed from the partition by upward displacement. Since the filter bags normally occupy a substantial portion of the height of the baghouse, the removal of the filter bags through the top requires overhead clearance approximately the same height as the baghouse, at least the length of the filter bag and the cage. Removal of the filter bags in this fashion frequently contaminates the clean side of the baghouse with particulate matter which becomes inadvertently dislodged from the bags during the removal operation.

An alternate method of replacing the filter bags is provided by an access door in the baghouse at the dirty side of the partition. By means of the access door, a worker may enter the baghouse and remove the filter bags from the underside of the partition and this operation requires the installation of special supports to enable the workers to perform their necessary operations within the baghouse chamber. Such supports may impair the discharge of particulate matter dislodged from the filter bags.

In order to facilitate the replacement of the bags, a cassette-type filter has been illustrated and described in U.S. Pat. No. 4,141,704 of AB Svenska Flaktfabriken. In this patent, the filter bags are embodied in a cassette which includes an internal support for the internal frame or cage for supporting the filter bags and a support structure which is fitted into the baghouse and latched into position for air-tight engagement of the cassette within the baghouse. However, such an arrangement is relatively expensive to manufacture and maintain.

SUMMARY OF THE INVENTION

The present invention provides an improved baghouse in which the filter bags may be displaced from the filter chamber for servicing, such as replacement and repair in a simple and efficient matter.

More particularly the present invention provides a baghouse in which the transverse partition which mounts the bags is formed integrally with an access door of the housing so that upon displacement of the access door, the supporting partition is similarly displaced to a position which exposes the filter bags mounted in the partition for servicing.

The present invention provides an improved sealing arrangement between the partition and the housing and also between the individual filter bags and the partition so that flow of gaseous medium through the housing must pass through the filter bags so as to deposit the particulate matter carried by the flow on the exterior surface of the filter bags. The sealing arrangement also protects the operating mechanism for displacing the partition against accumulation of particulate matter.

The invention also provides an improved mounting arrangement for the filter bags in the partition which facilitates removal of the dirty filter bags and replacement.

More specifically the present invention provides a filter unit for mounting in the partition having a collar at the top for releasable engagement with the partition and simple but effective means to anchor the open end of the filter bag on the collar so that it is suspended within the housing.

BRIEF DESCRIPTION OF THE DRAWINGS

All of the features of the invention are more fully set forth hereinafter with reference to the accompanying drawings wherein.

Figure 1:
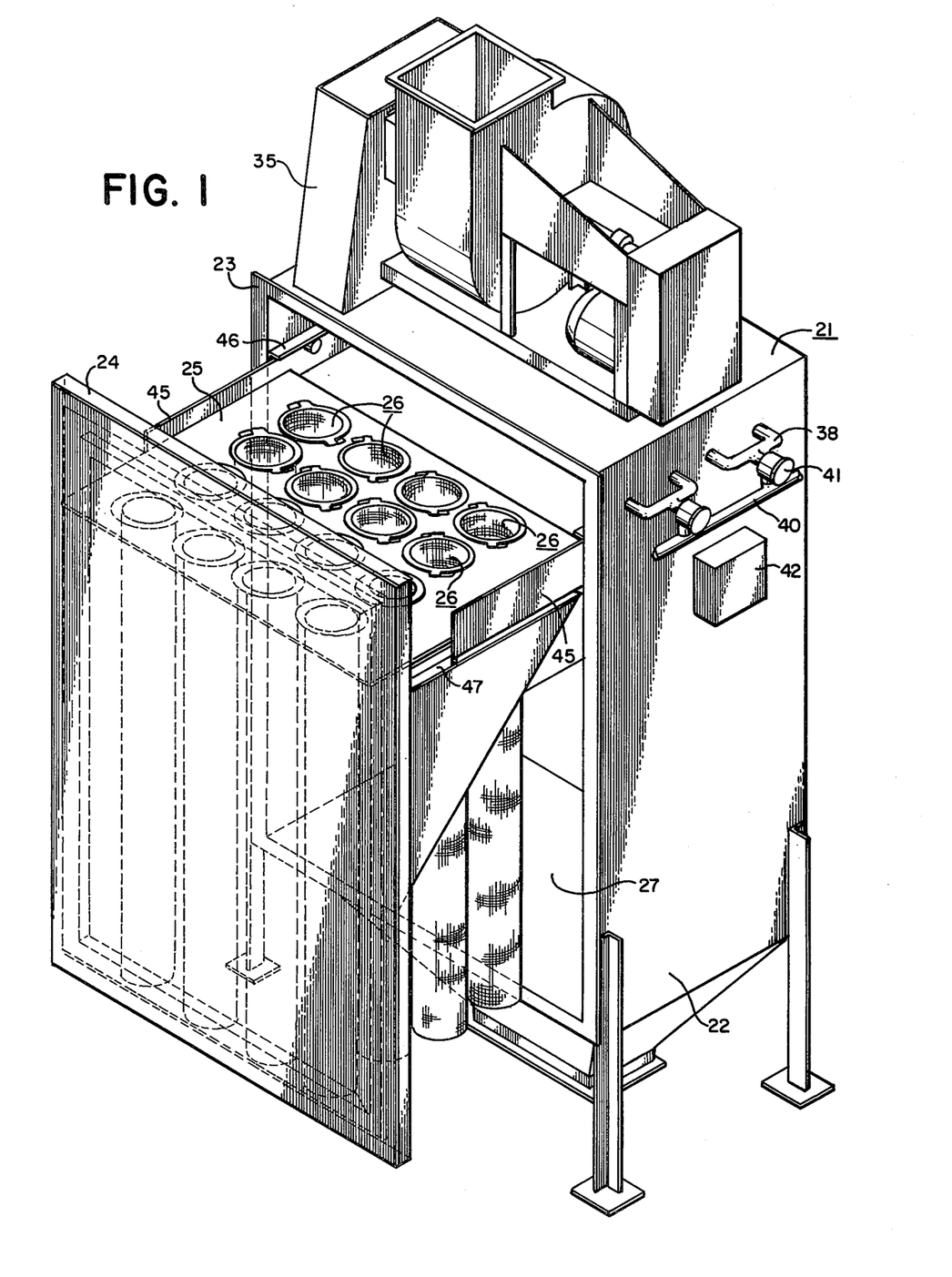
FIG. 1 is a perspective view of a baghouse filter made in accordance with the present invention wherein the transverse partition is displaced exteriorly of the filter housing.
Figure 2:
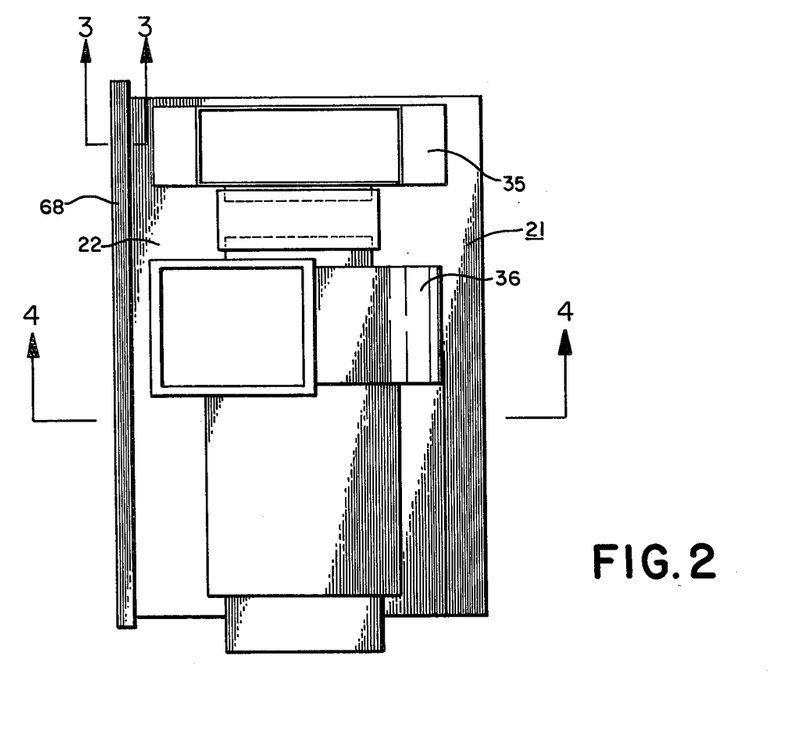
FIG. 2 is a plan view of the baghouse filter of FIG. 1 with the partition in place within the housing.
Figure 3:
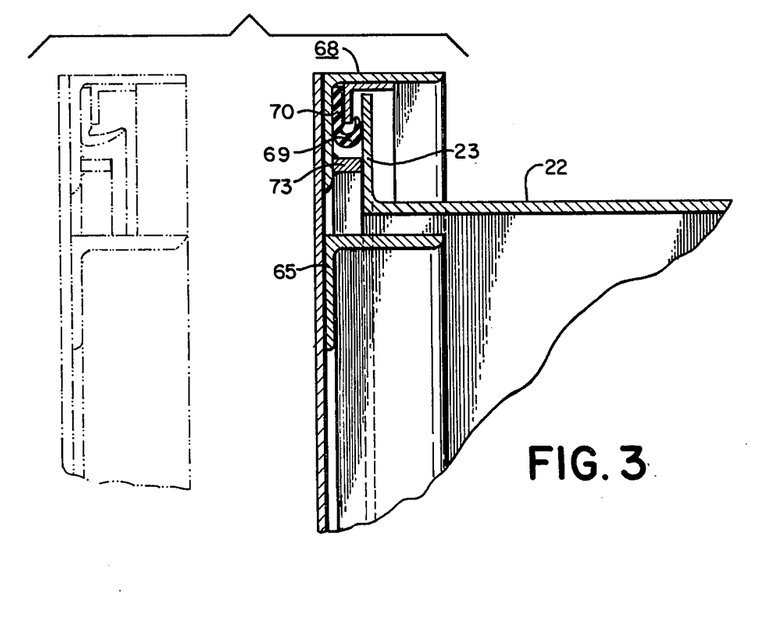
FIG. 3 is an enlarged fragmentary sectional view taken on the line 3—3 of FIG. 2 illustrating the seal between the door and the housing, the closed position of the door being shown in full lines and an open position being shown in broken lines.
Figure 4:
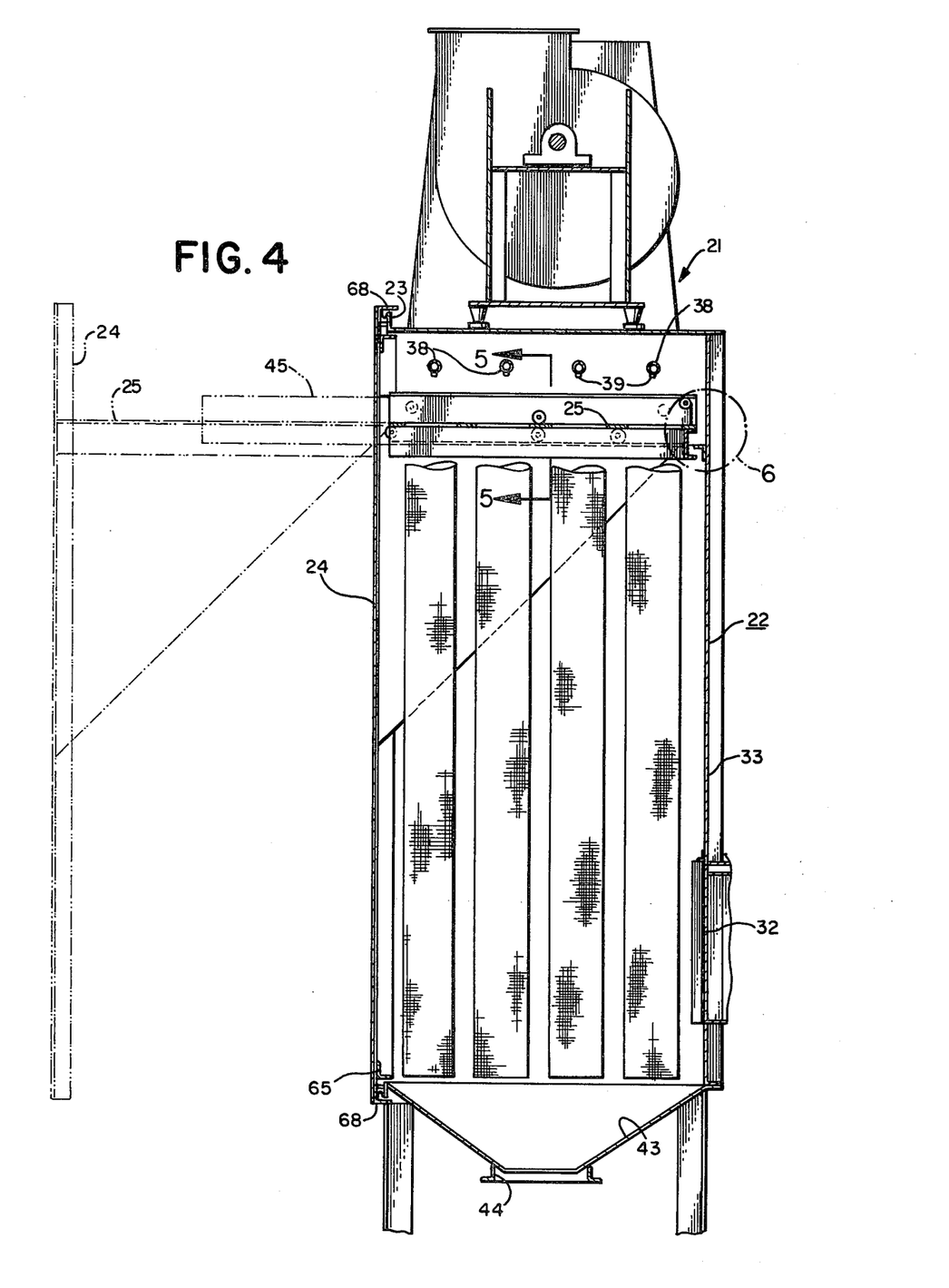
FIG. 4 is a sectional view taken on the line 4—4 of FIG. 2 showing the door closed in full lines and open in broken lines.

Referring now to the drawings, the baghouse filter 21 shown in FIGS. 1 to 9 includes a filter housing 22 having an open side enclosed by a frame 23 which cooperates with a closure door 24 carrying a transverse partition 25 mounting a plurality of individual filter units 26 in a bank. As described more fully hereinafter, the bank of filter units may be removed from the housing 22 through the access opening 27 provided by the open side, the opening being at least coextensive with the outline of the bank of filter units. As shown in FIGS. 2 and 4, the housing 22 has a dirty air or other gaseous medium inlet 32 adjacent its lower end in the wall 33 opposite the open side frame 23. In the top wall above the partition 25 an outlet hood 35 is provided to withdraw clean or gaseous medium from above the partition 25. The gaseous medium is drawn through the outlet connection 35 by a blower 36 which exhausts the cleaned gaseous medium to the atmosphere or through duct work to other treatment facilities.

As shown in FIG. 4, filter-cleaning means is provided to dislodge particulate matter which accumulates on the individual filter units. To this end the baghouse filter incorporates means to project jets of compressed air into the centers of the individual filter units. In the present instance the jet means comprises a series of supply pipes 38 overlying the open ends of the filter units and having downwardly directed nozzles 39 operable to project jets of compressed air into the centers of the filter units to dislodge particulate matter which might otherwise accumulate on the exterior surface of the filter units by causing a reverse flow through the filter material. The supply pipes 38 are fed with compressed air from a main supply line 40 through valves 41 which are controlled for either operation in unison at specified intervals or operation in sequence by a control unit 42 which may be responsive to the back pressure in the inlet side of the filter housing. The particulate matter dislodged from the outside of the individual filter units is collected in the bottom of the housing as indicated at 43, from which it may be discharged through a dust outlet 44. The dust outlet may be a simple valve which is periodically opened or may lead into a sluice-type arrangement for continuous discharge of particulate material without permitting escape of dirty gaseous medium with the material.

Figure 5:
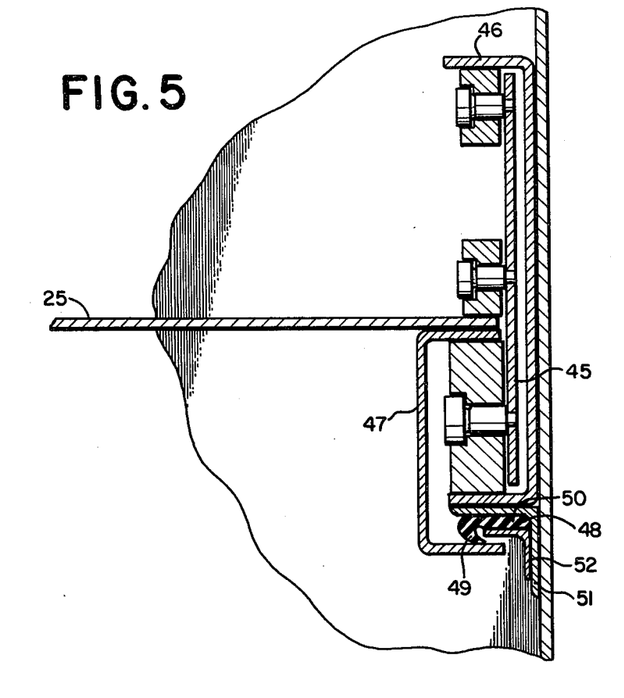
FIG. 5 is an enlarged fragmentary sectional view taken on the line 5—5 of FIG. 4.

In accordance with the invention, the partition 25 is mounted for unidirectional displacement with the door 24 as it is moved between its opened and closed positions. To this end the door 24 is carried by the partition which, in turn, is supported on roller-glides 45 slidably mounted on horizontal trackways 46 secured to the side walls of the housing. As shown in FIG. 5, the partition 25 has a channel member 47 cooperating with the roller-guides 45 to provide support for the partition as it is displaced in the trackways 46. The mounting of the partition in the housing is similar to the mounting of a file drawer in a file cabinet. In this way, when the door 24 is opened by sliding it out on the tracks 46, the entire side of the housing within the frame 23 is open to provide an access opening 27 into the filter chamber above and below the partition 25. As shown, the size of the access opening is sufficiently great to permit the partition 25 with the multiple filter units 26 depending therefrom, to pass out of the filter chamber where they are readily accessible.

Closure of the door 24 carries the partition 25 into its operative position in which the partition interrupts flow from the inlet 32 to the outlet 35, except through the filtering units 26. To ensure against leakage of air around the edge of the partition 25, sealing means is provided to seal between the partition 25 and the side walls of the housing which mount the tracks 46. In the present instance, as shown in FIG. 5, the sealing means is fixed to the underside of the track 46 and consists of an elastomeric sealing element 48 having a free sealing lip 49 at its outer end which rides against the channel member 47 to provide a seal between the side wall of the housing and the partition 25. In the present instance the elastomeric member has a generally flat body portion 50 which is retained between angle members 51 and 52 which serve as a holder for the sealing element. The flexible lip portion 49 of the sealing element extends beyond the angle member 51 and 52 and is formed with an angular orientation relative to the body portion 50. The lip 49 bears against the upper surface of the lower flange of the channel member 47 which projects toward the wall mounting the angle members 51 and 52 and overlaps the outwardly projecting legs of the angle members to provide a labyrinth passage between the angle member 52 and the channel member 47, the sealing lip 49 being mounted to interrupt this passage. By this construction, flow of air or other gaseous medium around the sides of the partition 25 is effectively prevented when the partition is in its operative position within the housing.

Figure 6:
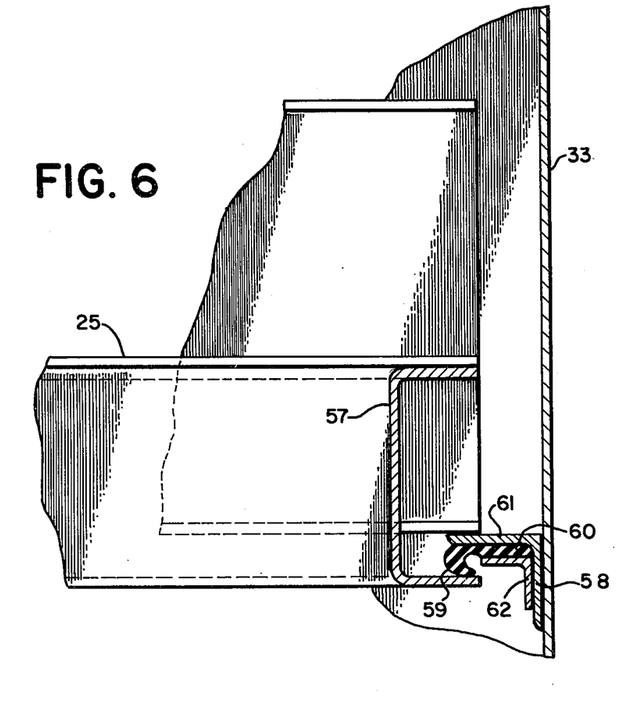
FIG. 6 is an enlarged fragmentary sectional view showing the sealing arrangement between the partition and the rear wall of the housing in the area indicated by the broken line circle 6 in FIG. 4.

A similar sealing arrangement is provided between the rear edge of the partition 25 and the wall 33 of the housing 22. To this end, as shown in FIG. 6, the inner or rear edge of the partition 25 is provided with a reinforcing channel member 57 extending across the entire width of the partition member, the channel member having an upstanding web and rearwardly directed flanges in a manner similar to the channel member 47. A sealing assembly is mounted on the wall 33 to cooperate with the lower flange of the channel member 57. In the present instance the sealing assembly 58 is similar to the sealing assembly 48, consisting of an elastomeric sealing element having a sealing lip 59 and a body portion 60 retained between angle members 61 and 62. The sealing assembly 58 extends across the full width of the chamber between the opposite tracks 46 and meets the sealing assemblies 48 to provide a continuous air-tight seal around three sides of the partition 25 when it is in its operative position within the housing. The fourth side of the partition 25 is mounted directly on the door 24.

The door 24 is effectively sealed against the housing 22 to prevent leakage through the access opening 27 when the door is in its operative position closing the access opening. To this end, as shown in FIG. 3, a peripheral seal is provided about the entire periphery of the door 24 to cooperate with the frame 23. An angle-iron reinforcing component 65 is spaced inwardly from the outer periphery of the door so that the projecting flange fits within the access opening within the frame 23. The angle member 65 is spaced inwardly from the outer edge of the door 24 and cooperates with a sealing assembly 68 to straddle the frame 23. The sealing assembly 68 is similar to the sealing assemblies 48 and 58 described above including an elastomeric sealing element having a lip 69 and a body part 70. To prevent excessive pinching of the sealing lip 69, an abutment strip 73 is mounted on the sealing assembly 68 to provide an abutment on the door to serve as a stop against the frame 23 of the housing 22. When the abutment strip 73 closes against the frame 23, the sealing lip 69 is deflected into sealing engagement with the frame 23, but is prevented from being pinched. Since the sealing unit 68 is disposed about the entire periphery of the door 24, an effective seal is provided for the access opening when the door is closed and the partition 25 is in the operative position.

It is noted that the filtering assembly consisting of the partition 25 and filter units 26 moves unidirectionally in a continuous path defined by the trackways 46 between said open and closed positions, the final increment of movement into the closed position being effective to position the sealing assemblies 58 and 68 in their respective sealing positions, so that there is no need for transverse displacement of the assembly to effect a proper seal. Suitable sealing arrangements (not shown) are provided between the partition sealing assembly 48 and the door seal 68 to prevent leakage around the partition when the door is closed.

Figure 9:
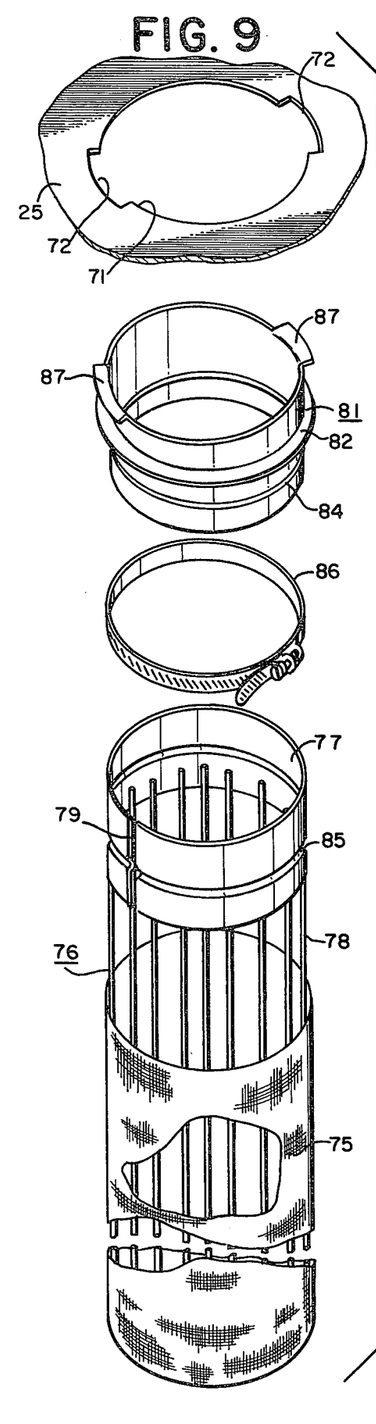
FIG. 9 is an exploded fragmentary view illustrating the components shown in FIGS. 7 and 8.

The filter units 26 are mounted in the partition 25 for ready removal and replacement from the underside when the door is opened and the partition is displaced outwardly through the access opening 27. To this end, the partition 25 has a plurality of filter openings, in the present instance arranged in four rows and four columns. The number of openings in the partition 25 is designed to provide the desired throughput of filtered air or gas, the combined cross section of the openings providing the desired flow area for filtered medium through the housing. In the present instance, as best shown in FIG. 9, each filter opening 71 is generally circular in outline and has a plurality of recesses 72, in the present instance two, spaced about its periphery. With two recesses 72, they are spaced diametrically opposite. Each opening is designed to accommodate a filter unit consisting of a filter bag closed at one end and open at the other end, the open end having mounting means for releasably engaging the filter unit in the filter opening 71.

Figure 7:
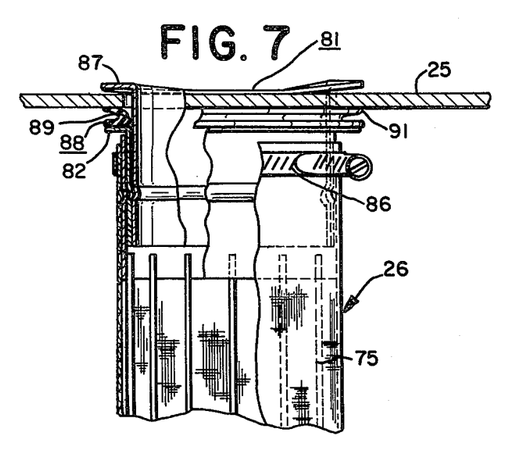
FIG. 7 is a sectional view with portions broken away illustrating the mounting of a filter unit in the transverse partition.
Figure 8:
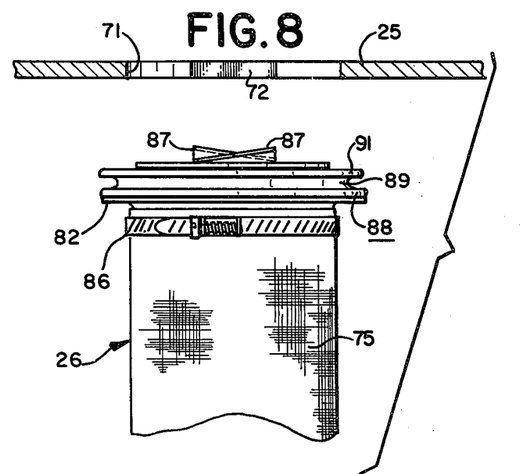
FIG. 8 is an exploded sectional view showing the filter unit dismounted from the partition.

Each filter unit 26, as shown in FIGS. 7 through 9, includes a filter bag 75 of suitable filter material which may be designed for one-time usage or repeated usage, according to the character of the gaseous flow being filtered in the baghouse. The filter bag 75 is generally cylindrical in form and is closed at the bottom end and open at the top. To maintain the bag in its generally cylindrical form, a cage 76 is fitted in the interior of the bag. As shown in FIG. 9 the filter cage 76 comprises a ring 77 adapted to fit within the open end of the filter bag 75. Depending downwardly from the ring and secured thereto, for example by welding, are a plurality of finger rods forming the cage extending the full length of the filter bag 75 so as to maintain it in its generally cylindrical configuration. The ring 77 is adapted to telescopically engage over a mounting collar 81 having a diameter corresponding to the diameter of the filter opening 71 in the partition 25 and being of generally cylindrical form so as to engage within the ring 77.

To facilitate the engagement of the ring 77 on the collar 81, the ring 77 is split as indicated at 79 to permit limited expansion and contraction of the ring to fit snugly over the bottom portion of the collar. The collar 81 has a medial flange 82 projecting outwardly at a level below the upper extremity of the collar and above the lower extremity. The distance between the flange 82 and the bottom of the collar is less than the clear space within the ring 77 above the upper extremities of the fingers 78, so that the flange assures that the upper ends of the fingers 78 are positioned below the lower edge of the collar 81. To ensure a proper interlock between the collar 81 and the split ring 77, the lower portion of the collar 81 below the flange 82 has a circumferential groove 84 and the ring 77 has a corresponding circumferential groove 85 which is adapted to seat within the groove 84 when the ring 77 is telescopically engaged with the collar 81 (see FIG. 7). After secure telescopic engagement and interlock through the grooves 84 and 85, the filter unit is retained in assembled condition by an anchor strap 86 which circumscribes the mounting collar 81, the ring 77, and the upper open end of the filter bag 75 to clamp these parts together into a unitary filter assembly. The clamping device 86 is shown as a conventional strap which is adapted to be screwed into tight engagement, but other clamping devices may be used with good effect where it is desired to facilitate the disassembly and reassembly of the filter unit. For example the cage of the filter assembly may be fabricated as an integral structure so that the clamping device need only function to anchor the filter bag on the integral cage. In such case an elastic band or circlet may be a sufficient clamping device.

To mount the collar 81 in the partition 25, the collar is provided with a pair of locking tabs 87 projecting outwardly from the upper edge. As clearly shown in FIG. 9, the width and length of the locking tabs 87 corresponds to the width and length of the recesses 72 so that the locking tabs 87 may pass through the recesses 72 when the collar is displaced axially through the opening 71. The assembled filter unit 26 is adapted to be sealingly engaged in the filter opening 71 in a simple and effective manner. To this end, the filter unit has a sealing ring or circlet 88 mounted between the flange 82 and the locking tabs 87. The sealing ring 88 is an elastomeric annulus of generally U-shaped cross section having a base portion 89 adapted to fit within the angle provided between the flange 82 and the cylindrical upper portion of the collar 81. To facilitate fabrication and assembly of the filter unit 26, the collar 81 is made in two telescopically-engaged cylindrical parts, and the sealing ring 88 is assembled between the flange 82 and the tabs 87 before the parts are interlocked by the formation of the groove 84. The resilient flexible nature of the annulus 88 enables it to seat snugly against the upper portion of the collar 81 so that the base portion 89 seals against the cylindrical portion of the collar. The lower flange of the annulus bears against the flange 82 to provide a seal and the upper flange 91 is flared radially and axially (see FIG. 7) to engage the undersurface of the partition 25 in the marginal area surrounding the aperture 71. The projection of the free flange 91 is sufficiently great to cover the recesses 72 of the opening 71 and prevent the escape of air or dirty gaseous medium through the recesses, thereby avoiding bypassing of the filter bag 75 by the medium flowing through the filter chamber.

In the present instance the tabs 87 are designed to effect compression of the sealing element 88 when the collar 81 is twisted into place within the opening 71. To this end each tab is inclined relative to the plane of the partition 25 so that when the collar is twisted counterclockwise in the opening 71 the leading edge of each tab is higher than the trailing edge. Thus engagement of the tab through the recesses 72 and twisting of the collar a partial turn causes the sloping body of the tab to act as camming surfaces against the edges of the recesses 72, displacing the collar upwardly as shown in FIG. 7 and compressing the sealing element 88 between the flange 82 and the undersurface of the partition 25. The inclination of the tabs 87 is best illustrated in FIG. 8. Thus the filter unit 26 is sealingly and securely engaged in the opening 71 by simple axial displacement followed by a fractional twist about its axis.

Figure 10:
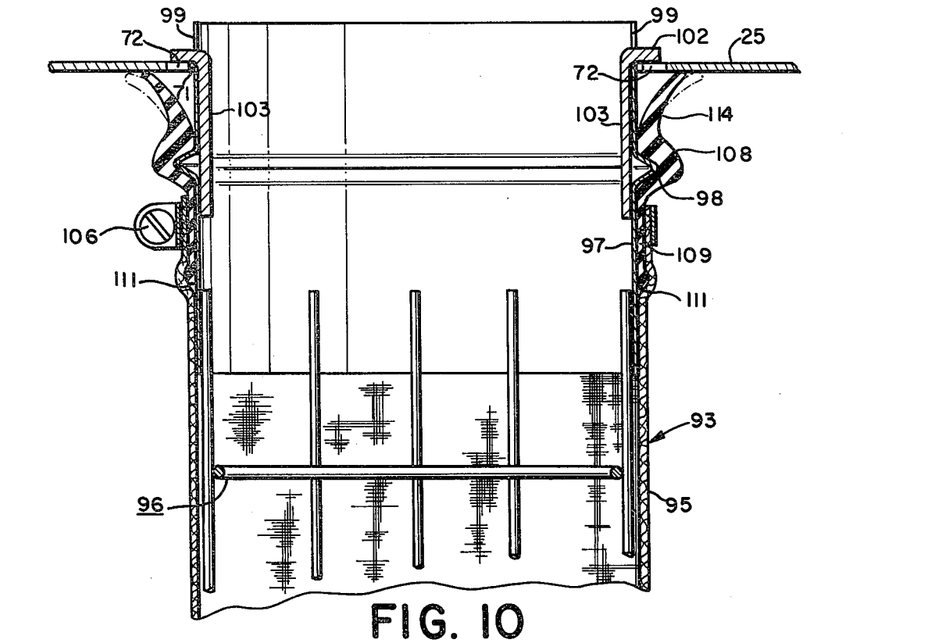
FIG. 10 is an enlarged sectional view illustrating the mounting of an alternate form of filter unit in the partition.
Figure 11:
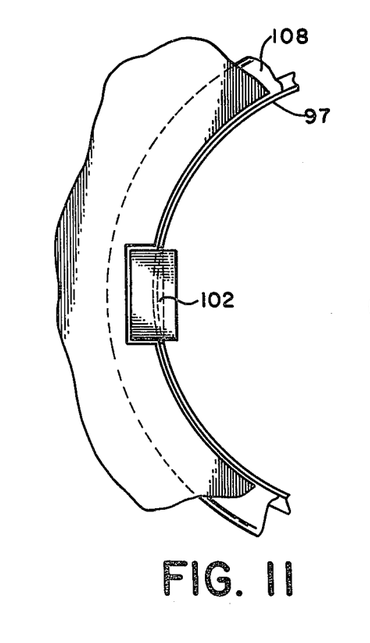
FIGS. 11 and 12 are fragmentary plan views of the structure shown in FIG. 10 illustrating the releasable mounting of the filter unit in the partition, FIG. 11 showing the unit in position for dismounting and FIG. 12 showing the unit in the mounted position.
Figure 12:
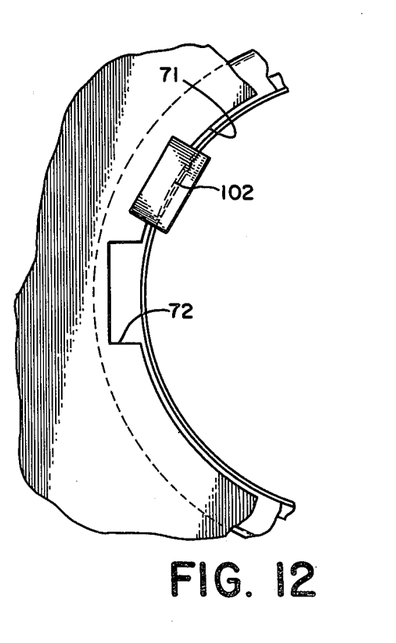

A simplified embodiment of a filter unit is shown at 93 in FIGS. 10-12 inclusive. Such filter unit is adapted to be mounted in the partition 25 which has openings 71 with recesses 72 as described above in connection with the filter unit of FIGS. 7-9. The simplified filter unit 93 includes a filter bag 95 which is similar to the bag 75, being generally cylindrical in form having a closed bottom an an open top. A cage 96 is fitted into the interior of the bag, and in the present instance the cage 96 has an upper ring portion 97 which is continuous and uninterrupted about its periphery and has an outwardly projecting rib 98 approximately midway of its height. The rib 98 serves not only to reinforce the cylindrical ring portion 97 but also provides a sealing portion to cooperate with a sealing annulus or circlet 108 which circumscribes the ring 97.

The ring 97 constitutes a mounting collar for the filter unit 93 which cooperates with any opening 71. The upper edge of the ring 97 is notched at diametrically opposite positions as indicated at 99, the spacing of the notches 99 corresponding to the spacing of the recesses 72 in the opening 71 of the partition 25. Locking tabs 102 project outwardly through the notches 99 and as shown in FIGS. 11 and 12 the tabs 102 register with the recesses 72 so as to pass through the recesses 72 when the filter unit 93 is displaced axially upward from the space below the partition 25 through the aperture 71. In the present instance the tabs 102 comprise projecting foot portions of angle members 103 secured to the interior wall of the ring 97 and having leg portions extending axially downward from the notches 99 to overlie the inwardly-directed side of the reinforcing rib 98. The angle members 103 may be tack welded or otherwise securely mounted to the ring 97 to provide a unitary assembly of the filter unit 93. Thus by inserting the filter unit axially through the opening 71 from the bottom and twisting it is partial turn so that the tabs 102 pass out of registry with the recesses 72, the filter unit is locked in place in the opening 71.

In this embodiment of filter unit, the sealing member 108 is designed not only to seal the filter unit within the opening and prevent escape of gas around the periphery of the filter unit, but also serves to bias the filter unit in place and cause the tabs 102 to seat firmly against the upper surface of the partition 25 in the marginal area surrounding the opening 71. When seated in place, the sealing member 108 is compressed against the undersurface of the partition 25 and provides frictional resistance against displacement of the filter unit 93 from the opening 71. To this end the sealing element is in the form of a hollow cylinder surrounding the ring 97. The lower edge of the sealing member 108 has a bead 111 disposed beyond a generally flat cylindrical portion 109 which fits between the ring 97 and the upper end of the filter bag 95. The bead serves to anchor the sealing element in place on the ring 97 when the unit is assembled by the attachment of a clamping strap 106 about the open end of the filter bag 95. As shown in FIG. 10, the clamp 106 unites the filter bag 95, the sealing element 108 and the cage ring 97 into a unitary assembly 93. The sealing member 108 has a groove adapted to engage over the rib 98 so as to provide an effective seal between the sealing element 108 and the ring 97. If the sealing element is securely mounted on the cage without the need for the clamp 106, it may terminate above the clamp, so that the clamp or other suitable retainer simply serves to anchor the bag on the cage.

Above the rib 98, the sealing element is provided with a flared lip 114 which is self-biased into engagement with the undersurface of the partition 25. The radial extension of the flared lip 114 is greater than the width of the recesses 72 in the periphery of the opening 71 so that the lip 114 circumscribes the entire opening on the underside of the partition. The character of the elastomeric material forming the sealing element 108 is sufficiently stiff so that the stiffness in the elastomeric material provides a bias which reacts against the undersurface of the partition 25 and presses the filter assembly downwardly so as to seat the lugs 102 firmly against the upwardly directed marginal portion of the opening 71. The construction shown in FIGS. 10 to 12 has proved to be highly effective in use and yet is inexpensive to manufacture and assemble, thereby permitting ready replacement of the filter bag 95 when it loses its filtering effectiveness. The bag 95 is readily stripped from the ring 97 for disposal or cleaning and replacement, as desired according to the character of the particulate material deposited on the bag during the filtering operation.

While particular embodiments of the present invention have been herein illustrated and described, it is not intended to limit the invention to such disclosure, but changes and modifications may be made therein and thereto within the scope of the following claims.

We claim:

1. In a bag filter comprising a housing having a dirty-gas inlet, a clean gas outlet, a partition having an operative position in the interior of said housing separating said inlet and outlet, said partition having a plurality of filter openings therein affording passage of gaseous medium from said inlet to said outlet, each of said filter openings having a filter unit mounted therein, said filter units comprising elongated bags of filter material, said partition and said units comprising a filtering assembly separating particulate matter from the gaseous medium flowing from the inlet to the outlet, said filtering assembly being mounted for displacement from said operative position into a second position affording ready removal and replacement of the filter units in said filter openings; the improvement wherein said housing has an access opening in a front wall thereof, said access opening being coextensive with an outline of said filtering assembly to enable at least a substantial part of said filtering assembly to pass through said access opening upon displacement between said operative and said second positions, a door closing said access opening when said filtering assembly is in said operative position, said filtering assembly having one end mounted on said door so as to effect displacement of said assembly with the door between said operative and second positions, and a free end opposite said one end, and door sealing elements disposed between said door and the housing around the periphery of said opening, and end sealing elements disposed between the opposite free end of the filtering assembly and a rear wall of the housing opposite said opening, said elements being positioned in sealing engagement by displacement of said door and filtering assembly from said second position into said operative position.

2. A bag filter according to claim 1 including means mounting said door and filtering assembly for unidirectional displacement in a continuous path between said operative and second positions, the positioning of said sealing elements being effected by the final displacement of said door and filtering assembly into said operative position.

3. A bag filter according to claim 2 wherein said mounting means comprises track means defining said continuous path and extending from said access opening to the wall of said housing opposite said opening, said filtering assembly having guide means engaging said track means to support and guide said assembly in its displacement in said continuous path.

4. A bag filter according to claim 3 wherein said guide means comprises rollers rotatable so as to roll on said track means, and side sealing elements extending along the length of said assembly between said access opening and the opposite wall when the assembly is in its operative position, said side sealing elements cooperating with said door and end sealing elements to cause the gaseous medium entering said housing to flow through said filter openings in said assembly.

5. A bag filter according to claim 4 wherein said housing is upright with the dirty gas inlet at the bottom and the clean gas outlet opening at the top, said track means comprising a pair of guide rails mounted on opposite walls of said housing from the front wall to the rear wall, transverse to the upright axis of said housing, each of said filter bags having one end open and the other end closed, said open ends being removably mounted within said filter openings and said closed ends being suspended below said partition, whereby the particulate matter entering the filter housing through said dirty gas inlet is deposited on the exterior of said bags below said partition.

6. A bag filter according to claim 1
wherein each of said filter units includes means
mounting said filter unit in said filter opening for removal and replacement from the inlet side of the partition when said assembly is in said second position.

7. A filter according to claim 6 wherein each of said filter openings is generally circular in outline with recess means along its periphery, said mounting means for each of said filter units comprises
a collar encircling said unit at one end, said collar having a cylindrical portion with an outer diameter corresponding to the diameter of said filter opening,
at least two locking tabs projecting outwardly from said cylindrical portion a distance to overlap the circular outline of said opening, the projection and circumferential width of said tabs being less than the depth and circumferential width of the recess means to enable passage of said tabs through said recess means upon axial displacement of said filter unit in said opening and to enable engagement of the tabs with the outlet side of said partition upon rotary displacement of said filter unit about the axis of said opening; and
sealing means projecting outwardly from said cylindrical portion spaced from said tabs a distance to seal against the inlet side of said partition, said sealing means circumscribing said opening and said recess means.

8. A filter according to claim 7 wherein each of said recess means comprises at least two diametrically-opposite recesses, each having a circumferential width corresponding to the circumferential width of the tabs, and a depth corresponding to the radial projection of the tabs, so that the unit may be engaged by axial displacement and locked by rotary displacement of the collar on the axis of said opening.

9. A filter according to claim 7 wherein said sealing means comprises a circlet of resilient elastomeric material anchored to said cylindrical portion and having a flared lip projecting radially and axially in the direction of said tabs to sealingly engage the surface of said partition on the inlet side thereof.

10. A filter according to claim 9 wherein each filter bag is open at one end and has the open end encircling said collar, and includes means to close the open end against said collar.

11. A filter according to claim 10 wherein said collar has circumferential means projecting radially outward from said collar between the end of said filter bag and the tabs, the outer diameter of said means being greater than the diameter of said filter openings, the flared lip of said circlet being disposed between said circumferential means and said tabs.

12. A filter according to claim 11 wherein said circlet has a portion below said flared lip sealing against said circumferential means.

13. A filter according to claim 12 wherein said circlet extends beyond said circumferential means and is mounted between the open end of said filter bag and said collar to provide a seal therebetween.

14. A filter according to claim 10 including a cage suspended from said collar within each of said filter bags to prevent collapse of said bags as gas flows through said bags from the inlet side of said partition to the outlet side thereof.

15. A filter according to claim 14 wherein said means to close the open end of each filter bag against said collar includes means clamping said filter bag around said cage, to form a unitary filter unit.

16. A filter according to claim 14 wherein said cage has an integral ring telescopically engaging said collar and said means to close the open end of each filter bag against said collar includes retainer means anchoring said bag on said ring.

17. A filter according to claim 7 including an angle member having an elongated leg mounted on the interior side of said cylindrical portion and a foot portion at right angles to said leg projecting outwardly to constitute said locking tabs.

18. In a bag filter comprising a housing having a dirty-gas inlet, a clean gas outlet, a partition having an operative position in the interior of said housing separating said inlet and outlet, said partition having a plurality of generally circular filter openings therein affording passage of gaseous medium from said inlet to said outlet, each of said filter openings having a filter unit mounted therein, said partition and said units comprising a filtering assembly separating particulate matter from the gaseous medium flowing from the inlet to the outlet, said filtering assembly being mounted for displacement from said operative position into a second position affording ready removal and replacement of the filter units in said filter openings; the improvement wherein each of said filter openings has recess means along its periphery;

each of said filter units includes means mounting said filter unit in said filter opening for removal and replacement from the inlet side of the partition when said assembly is in said second position;

said mounting means for each of said filter units comprises a collar encircling said unit at one end, said collar having a cylindrical portion with an outer diameter corresponding to the diameter of said filter opening, at least two locking tabs projecting outwardly from said cylindrical portion a distance to overlap the circular outline of said opening, the projection and circumferential width of said tabs being less than the depth and circumferential width of the recess means to enable passage of said tabs through said recess means upon axial displacement of said filter unit in said opening and to enable engagement of the tabs with the outlet side of said partition upon rotary displacement of said filter unit about the axis of said opening; and sealing means comprising a circlet of resilient elastomeric material anchored to said cylindrical portion and projecting outwardly from said cylindrical portion at a distance from said tabs to seal against the inlet side of said partition, said sealing means having a flared lip projecting radially and axially in the direction of said tabs circumscribing said opening and said recess means to sealingly engage the surface of said partition on the inlet side thereof; and each filter unit further includes a filter bag open at one end and having the open end encircling said collar, circumferential means projecting radially outward from said collar between the end of said filter bag and the tabs, said circlet having its flared lip disposed between said circumferential means and said tabs with a portion below said flared lip sealing against said circumferential means and an extended portion beyond said circumferential means mounted between the open end of said filter bag and said collar to provide a seal therebetween.

19. A filter according to claim 18 wherein said mounting means includes a pair of angle members each having an elongated leg mounted on the interior side of said cylindrical portion and a foot portion at right angles to said leg projecting outwardly, said foot portions constituting said locking tabs.

* * * * *